United States Patent [19]

Taylor

[11] Patent Number: 4,648,491

[45] Date of Patent: Mar. 10, 1987

[54] BRAKE SHOE RETAINER MOUNTING ASSEMBLY

[76] Inventor: Gordon J. Taylor, Tayco Pty. Ltd. P.O. Box 108, Corinda, QLD., Australia, 4075

[21] Appl. No.: 704,620

[22] Filed: Feb. 22, 1985

[51] Int. Cl.[4] .............................................. F16D 51/00
[52] U.S. Cl. ..................................... 188/341; 188/328
[58] Field of Search ................... 188/341, 206 A, 327, 188/328, 329, 332, 333

[56] References Cited

U.S. PATENT DOCUMENTS

| | | | |
|---|---|---|---|
| 1,994,801 | 12/1928 | Wright | 188/206 A |
| 2,181,022 | 11/1939 | Main | 188/327 |
| 3,136,390 | 6/1964 | Zukowski | 188/206 A |
| 3,194,359 | 7/1965 | Richards | 188/341 X |
| 4,440,274 | 4/1984 | Claydon | 188/328 |

FOREIGN PATENT DOCUMENTS 1534048 6/1968 France .............................. 188/341

Primary Examiner—Duane A. Reger
Assistant Examiner—Lawrence J. Goffney, Jr.
Attorney, Agent, or Firm—Wolf, Greenfield & Sacks

[57] ABSTRACT

The invention relates to a brake shoe retainer mounting assembly. The assembly has a cylindrical anchor pin with through bore. This pin is located to extend through the brake shoe and through a brake spider. A retaining washer is located at either end of the pin and the assembly is held in position by a fastener which extends through the bore.

5 Claims, 5 Drawing Figures

BRAKE SHOE RETAINER MOUNTING ASSEMBLY

The invention relates to a brake shoe retainer mounting assembly. In particular the invention concerns a mounting for pivotally securing brake shoes to a brake support or spider normally mounted relative to a vehicle axle.

Brake assembles in relation to which the invention may be employed include two brake shoes normally mounted on opposite sides of the brake spider. One set of adjacent ends of the shoes are pivotally connected to the spider either by one common anchor pin or each by its own anchor pin. The other end of each shoe is spring biased so that the shoes are urged towards one another and in this position the brake is disengaged. The other ends may be urged apart against the action of the biasing by a cam arm. Those ends of the shoes have rollers which co-operate with the cam arm and a retainer like that of my Australian Patent No. 534821 may be used to ensure that the rollers are maintained in operative engagement with the cam arm. The anchor pins consist of a pin having circlip retaining grooves at its ends. The anchor pin passes through the shoe, or where only a single pin is employed, passes through both shoes, and the spider and a washer is then positioned over the free ends of the pin and the assembly held in place by two circlips.

Circlips to function correctly need to be free running in their locating groove but should not be too loose a fit otherwise the parts held together have an unnecessary degree of movement and are therefor either prone to undue wear or misalignment of the parts is possible. The retaining washer was necessary to provide an adequate surface against which the shoe could abut. If tolerances between the circlip and the groove were not correct there was a danger that the washer would cause the circlip to spring out of its groove. If the washer was too large there was a danger that movement of the shoe axially of the pin could occur and therefor the shoe would not pivot true and the brake would not function as designed and was subject to undue wear or damage.

The environment in a brake assembly is not clean. Brake dust, moisture and other contaminants are present. Stones and other objects may enter the assembly. Such objects may strike the circlip and dislodge it. The contaminants enter the circlip retaining groove and the pivotal movement of the shoe relative to the anchor pin sometimes causes the circlip to come adrift. This is particularly so where contaminants prevent the circlip from being free running in its groove. Pivotal movement of the shoe or rotation of the pin causes the circlip to open and come out of the groove. Failure of the brake in these instances results not only in damage to the brake mechanism but to the vehicle.

Circlips have been used for some time in the mounting of brake shoes. It has not been until recent times that brake failure has been attributed to the problems mentioned above. These difficulties have only become apparent because of more stringent and regular safety checks of vehicles carried out by government transport authorities.

It is an object of the present invention to provide a brake shoe retainer mounting assembly which minimises the disadvantages mentioned above.

Accordingly, the present invention provides a brake shoe retainer mounting assembly for pivotally mounting brake shoes to a brake spider, the assembly including:

a cylindrical anchor pin having a longitudinal through bore;

a retaining washer located at each end of the anchor pin;

a fastener extending through the bore for clamping the washers against the ends of the pin, whereby in use said pin passes through an aperture in one brake shoe or through aligned apertures in two brake shoes and through an aperture in the spider and the fastener is tensioned to pivotally secure the or each shoe to the spider.

So that the washers may function in this way they are of a diameter larger than that of the anchor pin. The anchor pin may have various lengths depending upon particular requirements. It is preferred that the pin be of such a length that when it is used to mount one or two shoes to the spider that about two thousandths of an inch clearance exist between the washer and the shoe. The diameter of the pin may also vary depending upon circumstances. The diameter should closely match the diameter of the apertures in the shoe and the spider such that the shoe may still pivot during operation of the brake assembly.

In some instances it may be desired to prevent rotation of the anchor pin relative to the spider. One way in which this may be achieved is by providing a flat area on the pin against which a set screw or the like passing through the spider may bear. Another way in which this may be achieved is by providing the pin with a circumferential groove between its ends. A lock roll pin having a "C" shaped transverse section may pass through the spider and locate in the circumferential groove. The nature of the section of the lock pin lends it some resiliency and thus serves to inhibit rotation of the anchor pin.

The anchor pin may be heat treated metal if desired although heat treatment is not essential.

Particular preferred embodiments of the invention will now be described with reference to the accompanying drawings in which.

Figure 1:
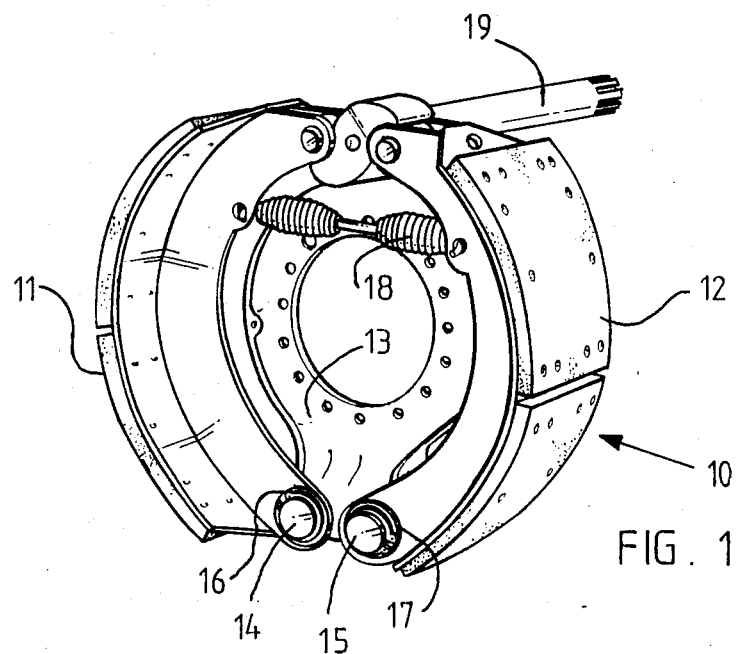
FIG. 1 is a perspective view showing a prior art arrangement for mounting brake shoes.

FIG. 1 shows a known brake assembly 10 having brake shoes 11, 12 pivotally coupled to a brake spider 13 by anchor pins 14, 15. These pins have circlips 16 (only one of which is visible) located in grooves at either end thereof. The circlip locates a washer 17 which inhibits removal of the shoes from the pin and hence out of pivotal engagement with the spider. Spring 18 biases the shoes together. The shoes may be urged apart by rotating cam arm 19.

Figure 2:
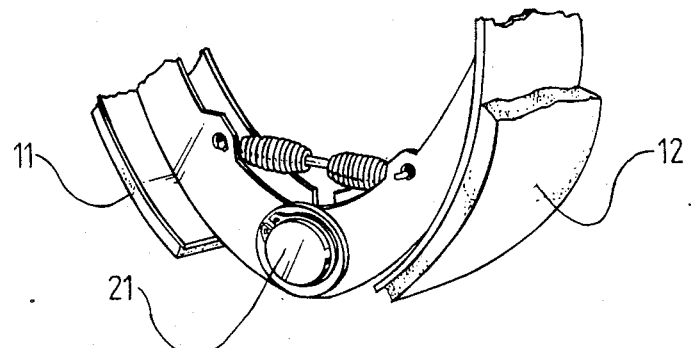
FIG. 2 is a fragmentary view of another prior art arrangement.

The arrangement of FIG. 2 is also known. Here a single pin 21 is employed for pivotally securing the shoes 11, 12 to the spider 13.

Figure 3:
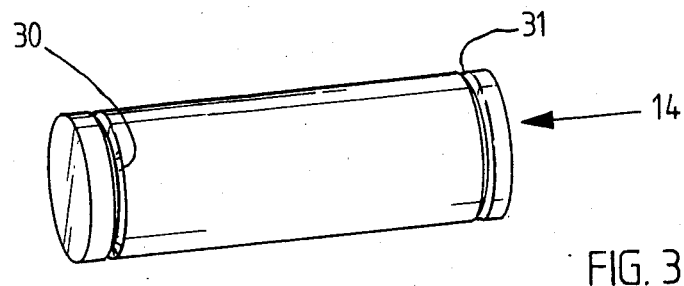
FIG. 3 is a view of a prior art anchor pin.

The pins 14, 15 and 21 have a configuration like that shown in FIG. 3. Two circlip retaining grooves 30, 31 are present at the ends of the pin.

Figure 4:
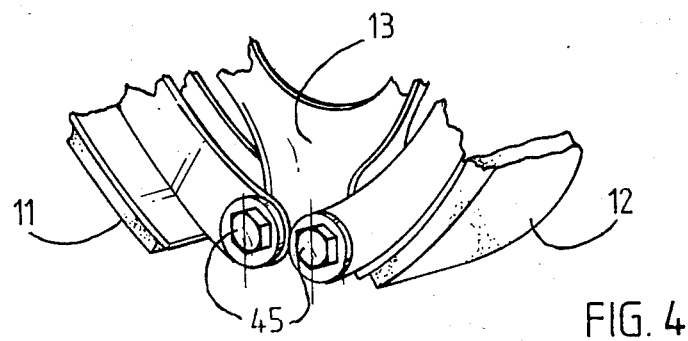
FIG. 4 is a perspective view of a brake shoe retainer mounting assembly in accordance with the invention; and, FIG. 5 is a sectional view showing details of the anchor pin of FIG. 4.
Figure 5:
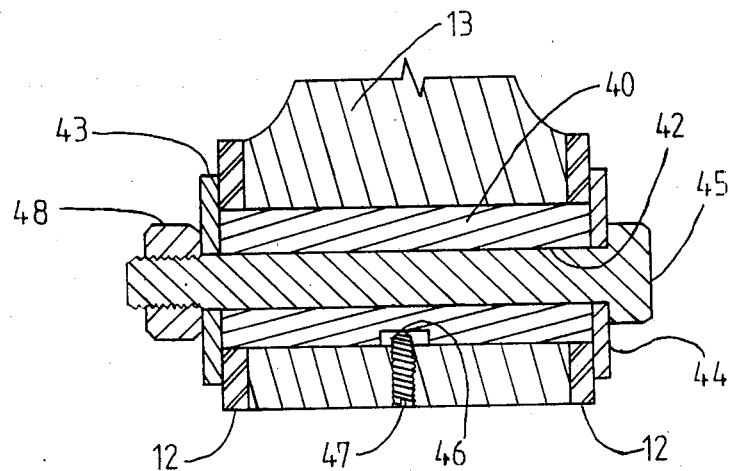

FIG. 4 shows a mounting assembly according to the invention. Anchor pins 40 are employed to pivotally retain the shoes, in position relative to the spider. Pins 40 have a through bore 42. Washers 43, 44 are positioned at either end of the pins and the assembly is secured in place by a fastener 45. This provides for positive pivotal mounting of the shoes to the spider. For a brake assembly like that of FIG. 2 only one mounting assembly according to the invention need be used. The length of the pin is chosen such that the shoe is held in place and allows pivotal movement but substantially no lateral movement. There may be slight clearance between the washers and the shoe. Clearance of about two thousandths of an inch has been found adequate.

If desired the pins 40 may be provided with a flat 46 within which a set screw 47 may locate. The set screw passes through the spider and ensures that the pin does not rotate. A lock nut 48 completes the fastener.

It will be seen that the assembly of the invention provides for positive pivotal securement of brake shoes to a spider. The assembly does not suffer from the disadvantages associated with prior securement means and provides a simple yet effective solution to the problems associated with the prior arrangements.

What I claim is:

1. A brake shoe retainer mounting assembly for pivotally mounting two brake shoes to a spider, the shoes having two spaced flanges having outer faces between which the spider is positioned, the assembly including:
    a cylindrical anchor pin having a longitudinal through bore, the pin having a length greater than the distance between the outer faces of the shoe flanges;
    a retainer washer located at each end of the anchor pin, each said washer having a diameter substantially larger than the diameter of the pin; and
    a fastener extending through the bore for clamping the washers against the ends of the pin, a respective said pin passes through aligned apertures in each said shoe and an aperture in the spider and when the fasteners are tightened the shoes are free to pivotally move relative to the respective said pin and the washers maintain the shoes in proper alignment relative to the spider.

2. The mounting assembly of claim 1 wherein said pin is made of heat treated metal.

3. The assembly of claim 1 wherein said pin is provided with a transversely extending flat against which locking means may abut to inhibit rotation of said pin.

4. The assembly of claim 1 wherein, when the fastener is tensioned, about two thousanths of an inch clearance remains between the shoe and the washers.

5. The assembly of claim 1 wherein the fastener comprises a bolt and a lock nut.

* * * * *